US010591715B2

(12) United States Patent
Shibayama et al.

(10) Patent No.: US 10,591,715 B2
(45) Date of Patent: Mar. 17, 2020

(54) FABRY-PEROT INTERFERENCE FILTER

(71) Applicant: HAMAMATSU PHOTONICS K.K., Hamamatsu-shi, Shizuoka (JP)

(72) Inventors: Katsumi Shibayama, Hamamatsu (JP); Takashi Kasahara, Hamamatsu (JP); Masaki Hirose, Hamamatsu (JP); Toshimitsu Kawai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 68 days.

(21) Appl. No.: 15/117,757

(22) PCT Filed: Feb. 3, 2015

(86) PCT No.: PCT/JP2015/052925
§ 371 (c)(1),
(2) Date: Aug. 10, 2016

(87) PCT Pub. No.: WO2015/122316
PCT Pub. Date: Aug. 20, 2015

(65) Prior Publication Data
US 2016/0357009 A1 Dec. 8, 2016

(30) Foreign Application Priority Data

Feb. 13, 2014 (JP) ................. 2014-025289

(51) Int. Cl.
G02B 26/00 (2006.01)
G02B 5/28 (2006.01)
G01J 3/26 (2006.01)

(52) U.S. Cl.
CPC .............. *G02B 26/001* (2013.01); *G01J 3/26* (2013.01); *G02B 5/284* (2013.01)

(58) Field of Classification Search
CPC .......... G02B 26/001; G02B 5/284; G01J 3/26
See application file for complete search history.

(56) References Cited

U.S. PATENT DOCUMENTS

2002/0097952 A1 7/2002 Jin et al.
2005/0134962 A1 6/2005 Verghese
(Continued)

FOREIGN PATENT DOCUMENTS

CN 103513415 1/2014
EP 2 369 398 9/2011
(Continued)

OTHER PUBLICATIONS

International Preliminary Report on Patentability dated Aug. 25, 2016 for PCT/JP2015/052925.
(Continued)

*Primary Examiner* — Cara E Rakowski
(74) *Attorney, Agent, or Firm* — Drinker Biddle & Reath LLP

(57) ABSTRACT

A Fabry-Perot interference filter includes a fixed mirror and a movable mirror disposed opposite to the fixed mirror via a gap, distance between the fixed mirror and the movable in a light transmission region being adjusted by electrostatic force. A plurality of first annular grooves surrounding the light transmission region and a plurality of first through-holes opening to the gap side and the opposite side are formed at a surrounding portion surrounding the light transmission region in the movable mirror.

8 Claims, 9 Drawing Sheets

(56) References Cited

U.S. PATENT DOCUMENTS

| | | |
|---|---|---|
| 2007/0146865 A1 | 6/2007 | An |
| 2008/0062359 A1 | 3/2008 | Inaba et al. |
| 2011/0019202 A1* | 1/2011 | Iwaki .................. G01J 3/26 356/519 |
| 2011/0279824 A1* | 11/2011 | Blomberg ............ G02B 26/001 356/519 |
| 2012/0127482 A1* | 5/2012 | Tanemura ............. G01J 3/26 356/519 |
| 2012/0194821 A1 | 8/2012 | Nozawa |
| 2013/0335748 A1 | 12/2013 | Tanemura et al. |

FOREIGN PATENT DOCUMENTS

| | | |
|---|---|---|
| JP | HP H6-241993 A | 9/1994 |
| JP | H07-286809 A | 10/1995 |
| JP | 2002-174721 A | 6/2002 |
| JP | 2011-191661 A | 9/2011 |
| JP | 2012-108371 A | 6/2012 |
| JP | 2012-112777 A | 6/2012 |
| JP | 2012-220912 A | 11/2012 |
| JP | 2013-506154 A | 2/2013 |
| JP | 2013-076779 A | 4/2013 |
| JP | 2014-002261 A | 1/2014 |
| WO | WO 2011/036346 A1 | 3/2011 |
| WO | WO 2012/168545 | 12/2012 |
| WO | WO 2015/002028 | 1/2015 |

OTHER PUBLICATIONS

B. Du Bois et al., "HF Etching of Si-Oxides and Si-Nitrides for Surface Micromachining," Sensor Technology 2001, Proceedings of the Sensor Technology Conference 2001, held in Enschede, The Netherlands, May 14-15, 2001, pp. 131-136.

* cited by examiner

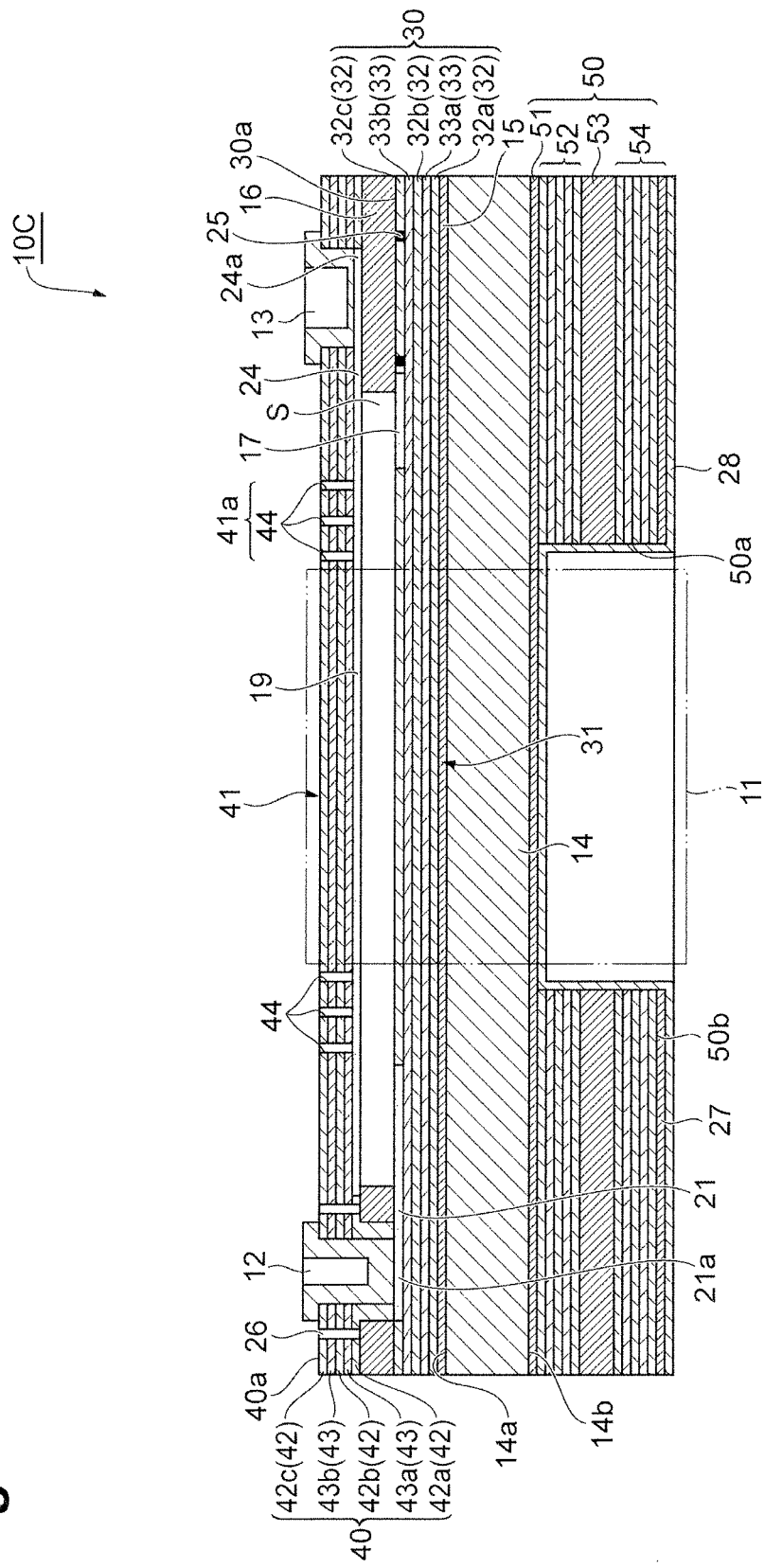

FABRY-PEROT INTERFERENCE FILTER

TECHNICAL FIELD

The present invention relates to a Fabry-Perot interference filter.

BACKGROUND ART

For example, Patent Literature 1 describes a Fabry-Perot interference filter including a fixed mirror and a movable mirror disposed opposite to each other via a gap where an annular groove surrounding a light transmission region and a plurality of through-holes positioned outside the annular groove are formed in the movable mirror. In this Fabry-Perot interference filter, the annular groove allows for the movable mirror in the light transmission region to be flat upon driving (when a distance between the fixed mirror and the movable mirror in the light transmission region is adjusted by electrostatic force). Incidentally, the plurality of through-holes positioned outside the annular groove is used as etching holes when the gap between the fixed mirror and the movable mirror is formed by etching.

CITATION LIST

Patent Literature

Patent Literature 1: JP-A-7-286809

SUMMARY OF INVENTION

Technical Problem

In such a Fabry-Perot interference filter as described above, enhancement of flatness of a movable mirror in a light transmission region upon driving and enhancement of durability of the movable mirror are desired.

An object of the present invention is therefore to provide a Fabry-Perot interference filter that allows for enhancing flatness of a movable mirror in a light transmission region upon driving and enhancement of durability of the movable mirror.

Solution to Problem

A Fabry-Perot interference filter of one aspect of the present invention includes a fixed mirror and a movable mirror disposed opposite to the fixed mirror via a gap, distance between the fixed mirror and the movable mirror in a light transmission region being adjusted by electrostatic force, where a plurality of first annular grooves surrounding the light transmission region and a plurality of first through-holes opening to the gap side and the opposite side are formed at a surrounding portion surrounding the light transmission region in the movable mirror.

In this Fabry-Perot interference filter, the plurality of first annular grooves surrounding the light transmission region is formed at the surrounding portion surrounding the light transmission region in the movable mirror. Due to this, the surrounding portion is easily deformed upon driving (when a distance between the fixed mirror and the movable mirror in the light transmission region is adjusted by electrostatic force). Furthermore, the plurality of first through-holes opening to the gap side and the opposite side is formed at the surrounding portion surrounding the light transmission region in the movable mirror. This results in good balance of stress generated in the movable mirror upon driving. Therefore, flatness of the movable mirror in the light transmission region upon driving can be enhanced. Moreover, the plurality of first through-holes formed in the surrounding portion allows for distributing the stress generated in the movable mirror upon driving. Therefore, durability of the movable mirror can be enhanced.

In the Fabry-Perot interference filter of one aspect of the present invention, a plurality of second through-holes opening to the gap side and the opposite side may be formed at an inner portion of the surrounding portion in the movable mirror. In this case, using the plurality of first through-holes and the plurality of second through-holes as etching holes when the gap between the fixed mirror and the movable mirror is formed by etching can save time required for forming the gap.

In the Fabry-Perot interference filter of one aspect of the present invention, a plurality of second annular grooves corresponding to the plurality of first annular grooves respectively in an opposing direction where the fixed mirror and the movable mirror are opposed may be formed in the fixed mirror. Furthermore, an outer portion of the plurality of second annular grooves in the fixed mirror may be provided with a first driving electrode to surround the light transmission region, and the movable mirror may be provided with a second driving electrode, a voltage being applied between the first driving electrode and the second driving electrode in order to generate electrostatic force. In this case, the plurality of second annular grooves electrically insulates the first driving electrode and an inner portion of the plurality of second annular grooves in the fixed mirror and thus flatness of the movable mirror in the light transmission region upon driving can be further enhanced.

In the Fabry-Perot interference filter of one aspect of the present invention, the fixed mirror may be provided with a compensation electrode to include the light transmission region, the compensation electrode being connected to the same potential as the second driving electrode, and the compensation electrode may be positioned on an opposite side of the second driving electrode with respect to the first driving electrode in the opposing direction. In this case, the compensation electrode formed in the fixed mirror in such a manner as to include the light transmission region has the same potential as that of the second driving electrode provided to the movable mirror and thus flatness of the movable mirror in the light transmission region upon driving can be further enhanced. Furthermore, since the compensation electrode is not positioned between the first driving electrode and the second driving electrode, electrostatic force corresponding to the voltage applied between the first driving electrode and the second driving electrode can be generated in a preferable manner.

In the Fabry-Perot interference filter of one aspect of the present invention, the fixed mirror may be provided with a compensation electrode to include the light transmission region, the compensation electrode being connected to the same potential as the second driving electrode, and the compensation electrode may be positioned inside the first driving electrode via the plurality of second annular grooves. In this case, the compensation electrode formed in the fixed mirror in such a manner as to include the light transmission region has the same potential as that of the second driving electrode provided to the movable mirror and thus flatness of the movable mirror in the light transmission region upon driving can be further enhanced. Furthermore, the plurality of second annular grooves can ensure electrical isolation between the first driving electrode and the compensation electrode disposed on the same plane in the fixed mirror.

Advantageous Effects of Invention

The present invention can provide a Fabry-Perot interference filter that allows for enhancing flatness of a movable mirror in a light transmission region upon driving and enhancement of durability of the movable mirror.

BRIEF DESCRIPTION OF DRAWINGS

FIG. 9 is a cross-sectional view of a Fabry-Perot interference filter of a third embodiment.

DESCRIPTION OF EMBODIMENTS

Hereinafter, embodiments of the present invention will be described in detail with reference to the drawings. Incidentally, the same or corresponding parts in the respective drawings are denoted with the same symbol while overlapping descriptions are omitted.

[First Embodiment]
[Spectral Sensor]

Figure 1:
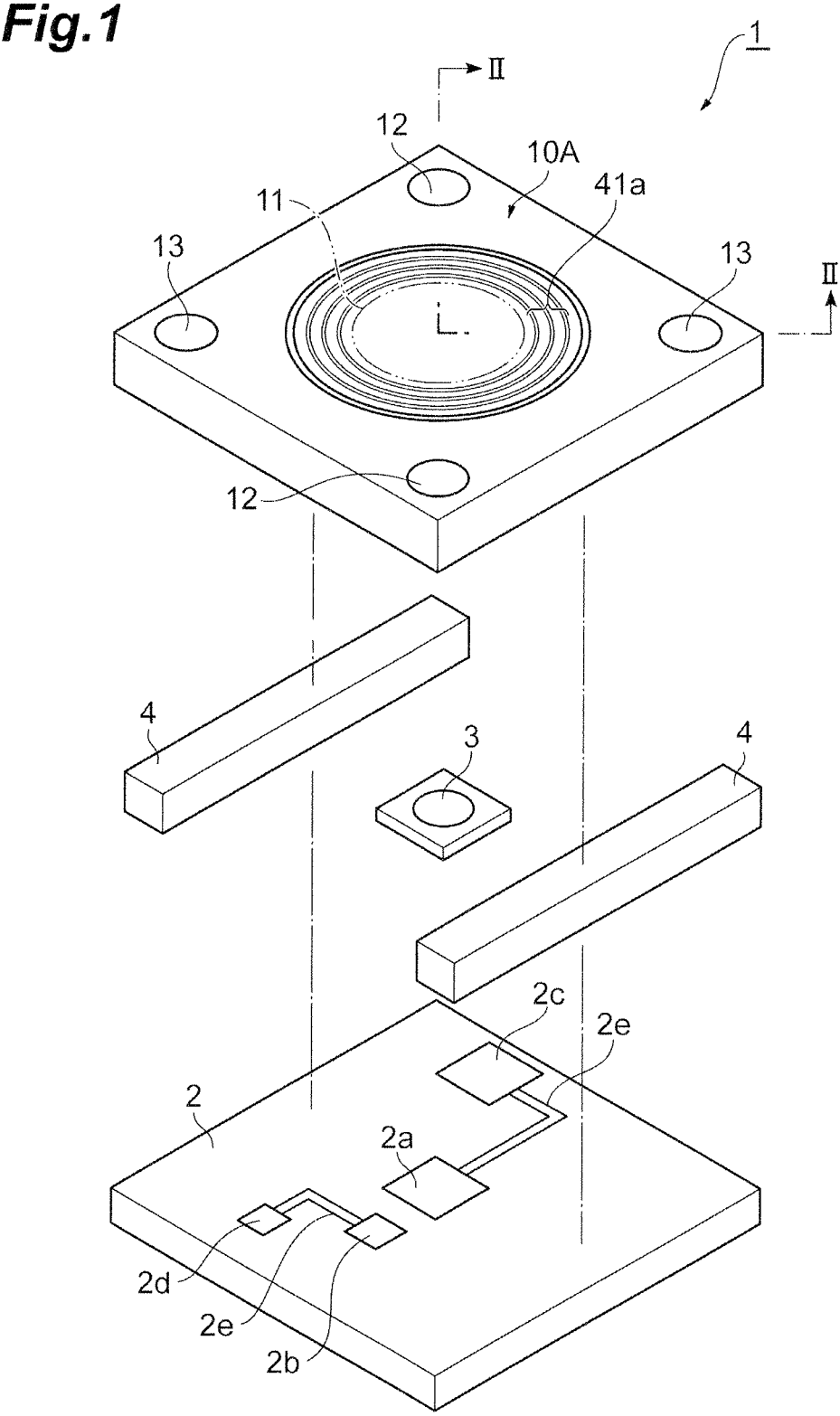
FIG. 1 is an exploded perspective view of a spectral sensor applied with a Fabry-Perot interference filter of a first embodiment.

As illustrated in FIG. 1, a spectral sensor 1 includes a wiring substrate 2, a light detector 3, a plurality of spacers 4, and a Fabry-Perot interference filter 10A. The wiring substrate 2 includes a mounting unit 2a mounted with the light detector 3, a mounting unit 2b mounted with a temperature compensation element (not illustrated) such as a thermistor, and electrode pads 2c and 2d. The mounting unit 2a is electrically connected to the electrode pad 2c by wiring 2e. The mounting unit 2b is electrically connected to the electrode pad 2d by wiring 2e. The light detector 3 is, for example, an infrared detector such as a quantum type sensor using InGaAs or the like or a thermal type sensor such as a thermopile, pyroelectric sensor, or bolometer. Incidentally, for detection of light in ultraviolet, visible, or near infrared region, a silicon photodiode or the like can be used as the light detector 3.

The Fabry-Perot interference filter 10A is fixed on the wiring substrate 2 via the plurality of spacers 4. In this state, the light detector 3 is opposed to the light transmission region 11 of the Fabry-Perot interference filter 10A between the wiring substrate 2 and the Fabry-Perot interference filter 10A. To fix the Fabry-Perot interference filter 10A to the respective spacers 4, a resin material having flexibility is used in order to suppress influence of heat stress on the Fabry-Perot interference filter 10A. It is desirable that the resin material is selected from materials of room temperature curing or cold curing of 150° C. or less. It is desirable that the plurality of spacers 4 is formed of a material having a thermal expansion coefficient equivalent to that of a substrate 14 included in the Fabry-Perot interference filter 10A such as quartz or silicon or a material having a small thermal expansion coefficient in order to mitigate a difference of thermal expansion coefficient especially at portions of the Fabry-Perot interference filter 10A fixed to the plurality of spacers 4. Incidentally, instead of separately forming the wiring substrate 2 and the respective spacers 4, the wiring substrate 2 and the respective spacers 4 may be integrally formed. It is also desirable that wiring substrate 2 is also formed of a material having a thermal expansion coefficient equivalent to that of the substrate 14 included in the Fabry-Perot interference filter 10A such as quartz or silicon or a material having a small thermal expansion coefficient.

Although not illustrated, the wiring substrate 2, the light detector 3, the plurality of spacers 4, and the Fabry-Perot interference filter 10A are cased in a CAN package in a state where the wiring substrate 2 is fixed on a stem and the light transmission region of the Fabry-Perot interference filter 10A is opposed to a light transmission window of a cap. Each of the electrode pads 2c and 2d of the wiring substrate 2 and each of terminals 12 and 13 of the Fabry-Perot interference filter 10A are electrically connected to each of a plurality of lead pins penetrating through the stem by wire bonding. Input, output, or the like of electrical signals to or from the light detector 3 and the temperature compensation element (not illustrated) is carried out via the lead pin, the electrode pad 2c, the wiring 2e, and the mounting unit 2a. Applying a voltage to the Fabry-Perot interference filter 10A is carried out via the lead pin and each of the terminals 12 and 13. Incidentally, input, output, or the like of electrical signals to or from the light detector 3 and the temperature compensation element may be carried out via the lead pin electrically connected to a terminal of each of the light detector 3 and the temperature compensation element by wire bonding.

In the spectral sensor 1 configured in the above manner, incidence of measurement light on the light transmission region 11 of the Fabry-Perot interference filter 10A from the opposite side of the wiring substrate 2 results in a change of air gap according to the voltage applied to the Fabry-Perot interference filter 10A and the light transmission region 11 of the Fabry-Perot interference filter 10A transmits light having a predetermined wavelength. The light transmitted by the light transmission region 11 is then detected by the light detector 3. In this manner, the spectral sensor 1 detects light, transmitted by the light transmission region 11, by the light detector 3 while changing the voltage applied to the Fabry-Perot interference filter 10A, thereby obtaining an optical spectrum.

[Fabry-Perot Interference Filter]

Figure 2:
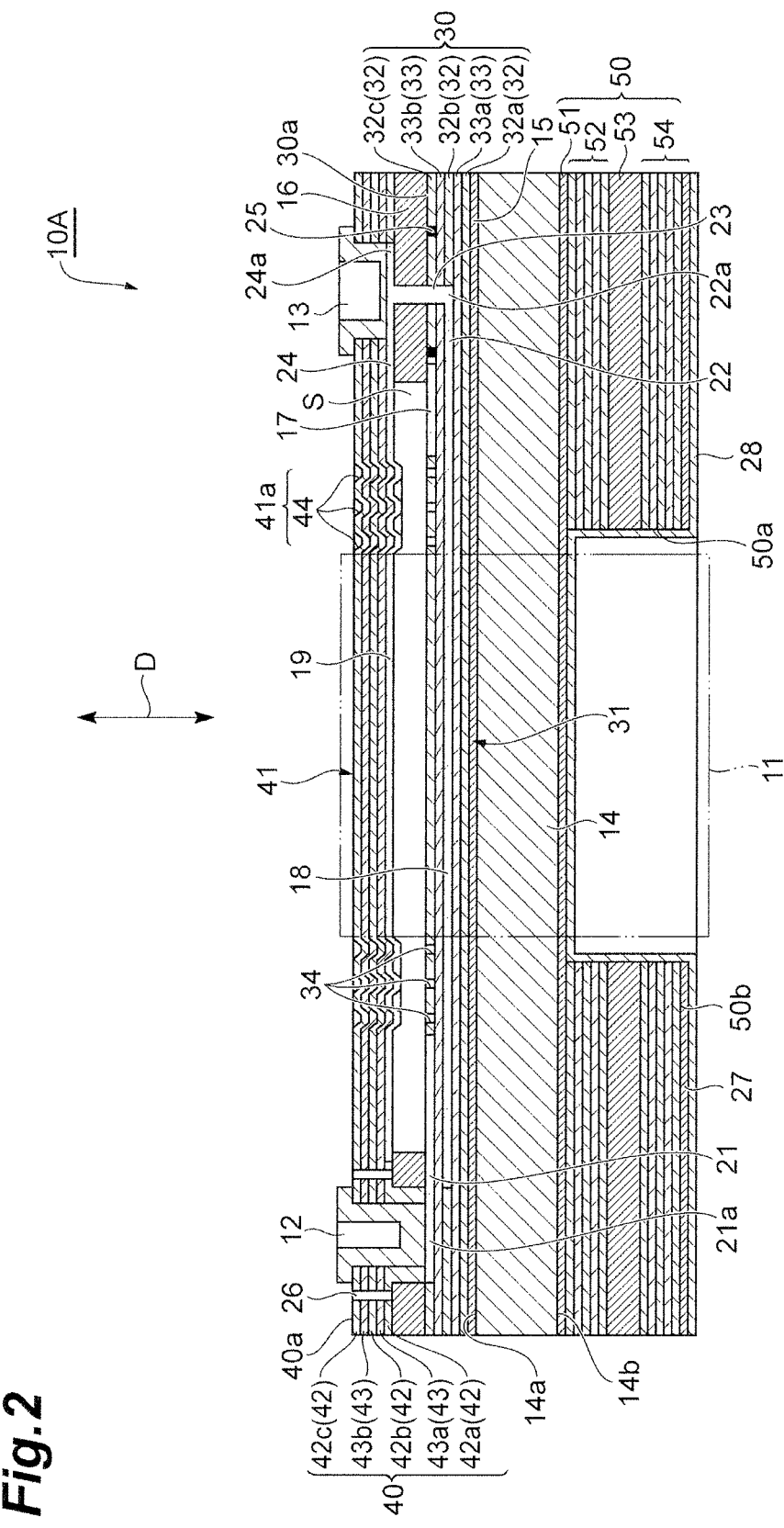
FIG. 2 is a cross-sectional view of a Fabry-Perot interference filter taken along line II-II in FIG. 1.

As illustrated in FIG. 2, the Fabry-Perot interference filter 10A includes a substrate 14 of, for example, a square plate shape. On a surface 14a of the substrate 14 on a light incident side, a reflection prevention layer 15, a first laminate 30, a support layer 16, and a second laminate 40 are laminated in the order mentioned. A gap S is formed between the first laminate 30 and the second laminate 40 as an air gap by the support layer 16 of a frame shape. The support layer 16 of a frame shape is formed by removing the center portion thereof as a sacrificial layer by etching. The light transmission region 11 of, for example, a cylindrical shape, is defined in the center part of the Fabry-Perot interference filter 10A. The substrate 14 is made of a light transmitting material such as silicon, quartz, or glass. The reflection prevention layer 15 and the support layer 16 are made of silicon oxide, for example. The thickness of the support layer 16 is preferably the integral multiple of ½ of a center transmission wavelength (median wavelength within a wavelength range of light that can be transmitted by the Fabry-Perot interference filter 10A), for example, 150 nm to 10 µm.

A portion of the first laminate 30 corresponding to a region facing the gap S functions as a fixed mirror 31. The first laminate 30 includes, for example, a plurality of polysilicon layers 32 and a plurality of silicon nitride layers 33, each of the layers laminated alternately. More specifically, on the reflection prevention layer 15 made of silicon dioxide or the like, a polysilicon layer 32a, a silicon nitride layer 33a, a polysilicon layer 32b, a silicon nitride layer 33b, and a polysilicon layer 32c are laminated in the order mentioned. The optical thickness of the polysilicon layer 32 and the silicon nitride layer 33 is preferably the integral multiple of ¼ of a center transmission wavelength, for example, 50 nm to 2 µm.

A portion of the second laminate 40 corresponding to a region facing the gap S functions as a movable mirror 41. The movable mirror 41 is disposed opposite to the fixed mirror 31 via the gap S. The second laminate 40 includes, for example, a plurality of polysilicon layers 42 and a plurality of silicon nitride layers 43, each of the layers laminated alternately. More specifically, on the support layer 16, a polysilicon layer 42a, a silicon nitride layer 43a, a polysilicon layer 42b, a silicon nitride layer 43b, and a polysilicon layer 42c are laminated in the order mentioned. The optical thickness of the polysilicon layer 42 and the silicon nitride layer 43 is preferably the integral multiple of ¼ of a center transmission wavelength, for example, 50 nm to 2 µm.

As illustrated in FIGS. 1 and 2, a pair of terminals 12 is provided opposite to each other with the light transmission region 11 interposed therebetween when seen from an opposing direction D where the fixed mirror 31 and the movable mirror 41 are opposed. Each of the terminals 12 is disposed inside a through-hole extending from a surface 40a of the second laminate 40 (that is, a surface of the polysilicon layer 42c of the second laminate 40) to the polysilicon layer 32c of the first laminate 30. A pair of terminals 13 is provided opposite to each other with the light transmission region 11 interposed therebetween when seen from the opposing direction D. Each of the terminals 13 is disposed inside a through-hole extending from a surface 40a of the second laminate 40 to the polysilicon layer 42a of the second laminate 40. Incidentally, a direction where the pair of terminals 12 are opposed and a direction where the pair of terminals 13 are opposed are perpendicular with each other.

Figure 3:
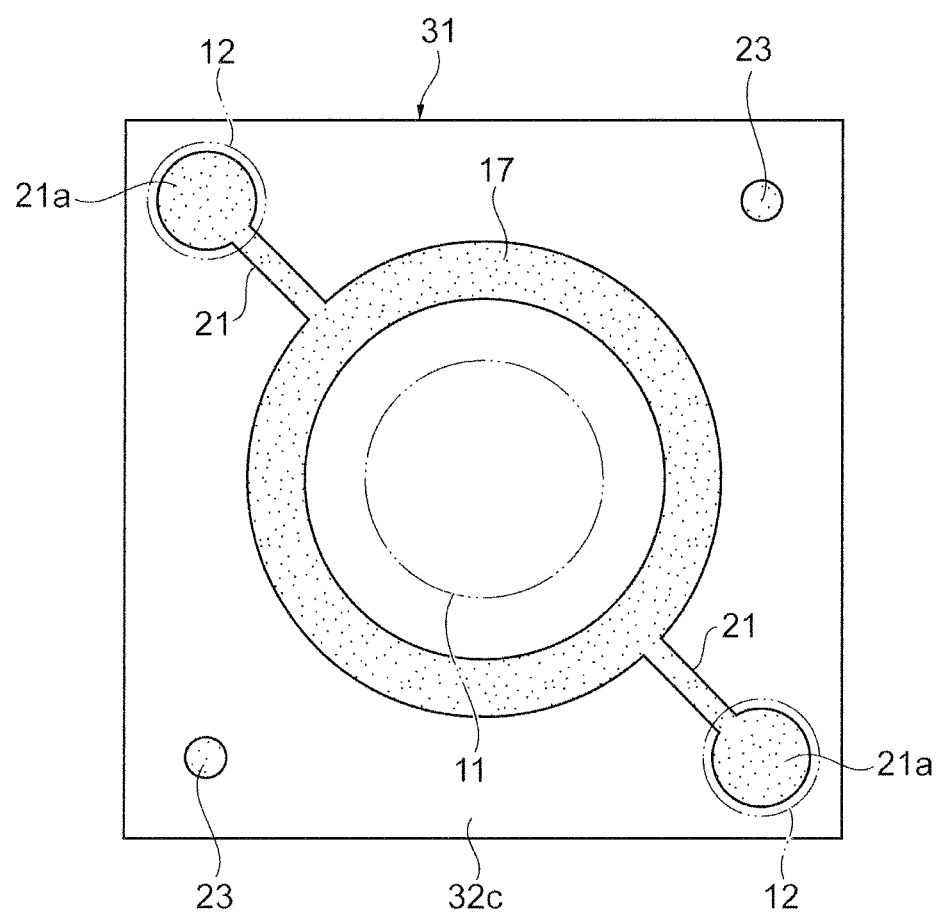
FIG. 3 is a plan view of a polysilicon layer provided with a first driving electrode.

As illustrated in FIGS. 2 and 3, the fixed mirror 31 is provided with the first driving electrode 17 of, for example, a circular shape, in such a manner as to surround the light transmission region 11. The fixed mirror 31 is further provided with a pair of wiring lines 21 such that the wiring line 21 extends from the first driving electrode 17 to immediately below each of the terminals 12 along a direction perpendicular to the opposing direction D. The first driving electrode 17 and the pair of wiring lines 21 are formed at a predetermined portion in the polysilicon layer 32c by doping an impurity and thereby reducing resistance in the predetermined portion. Each of the terminals 12 is connected to an end portion 21a of each piece of the wiring line 21, thus allowing the first driving electrode 17 to be electrically connected to each of the terminals 12.

Figure 4:
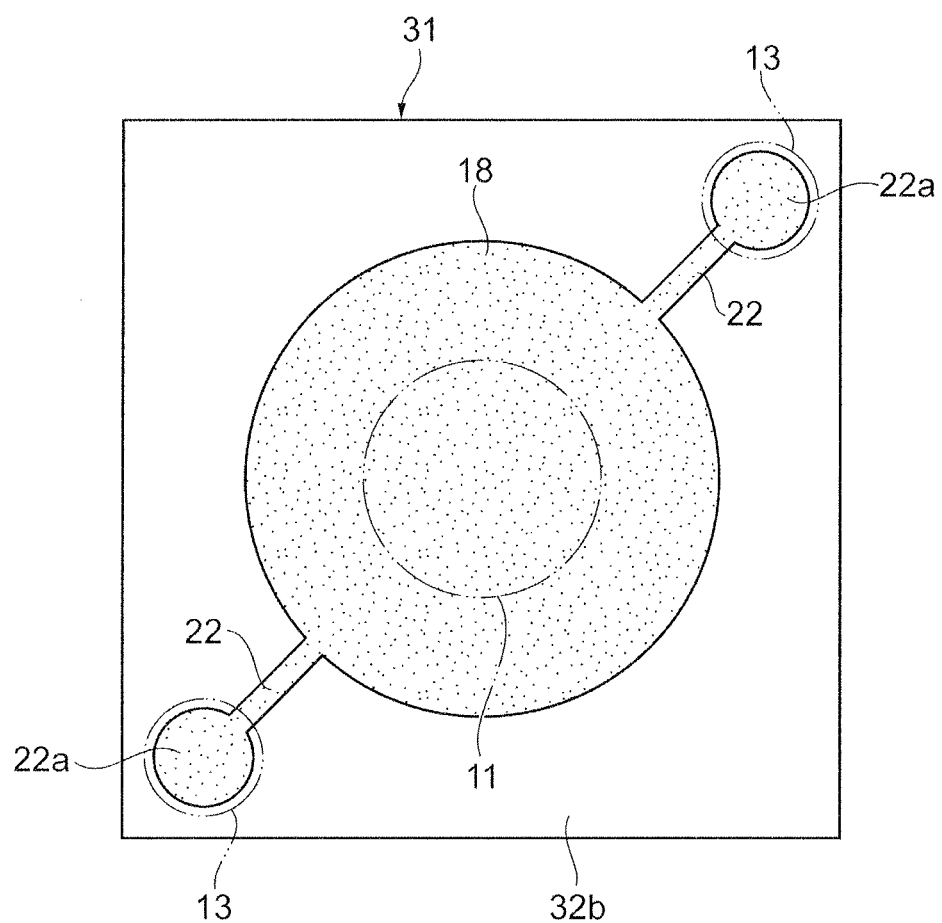
FIG. 4 is a plan view of a polysilicon layer provided with a compensation electrode.

As illustrated in FIGS. 2 and 4, the fixed mirror 31 is provided with a compensation electrode 18 of, for example, a circular shape, in such a manner as to include the light transmission region 11. The fixed mirror 31 is further provided with a pair of wiring lines 22 such that the pair of wiring lines 22 extends from the compensation electrode 18 to immediately below each of the terminals 13 along a direction perpendicular to the opposing direction D. The compensation electrode 18 and the pair of wiring lines 22 are formed at predetermined portions in the polysilicon layer 32b by doping an impurity and thereby reducing resistance in the predetermined portions. Each of the terminals 13 is connected to an end portion 22a of each piece of the wiring line 22 via wiring line 23, thus allowing the compensation electrode 18 to be electrically connected to each of the terminals 13. The wiring line 23 extends from the end portion 22a of each piece of the wiring line 22 to immediately below each of the terminals 13 along the opposing direction D and is disposed inside a through-hole extending from the polysilicon layer 42a of the second laminate 40 to the polysilicon layer 32b of the first laminate 30.

Figure 5:
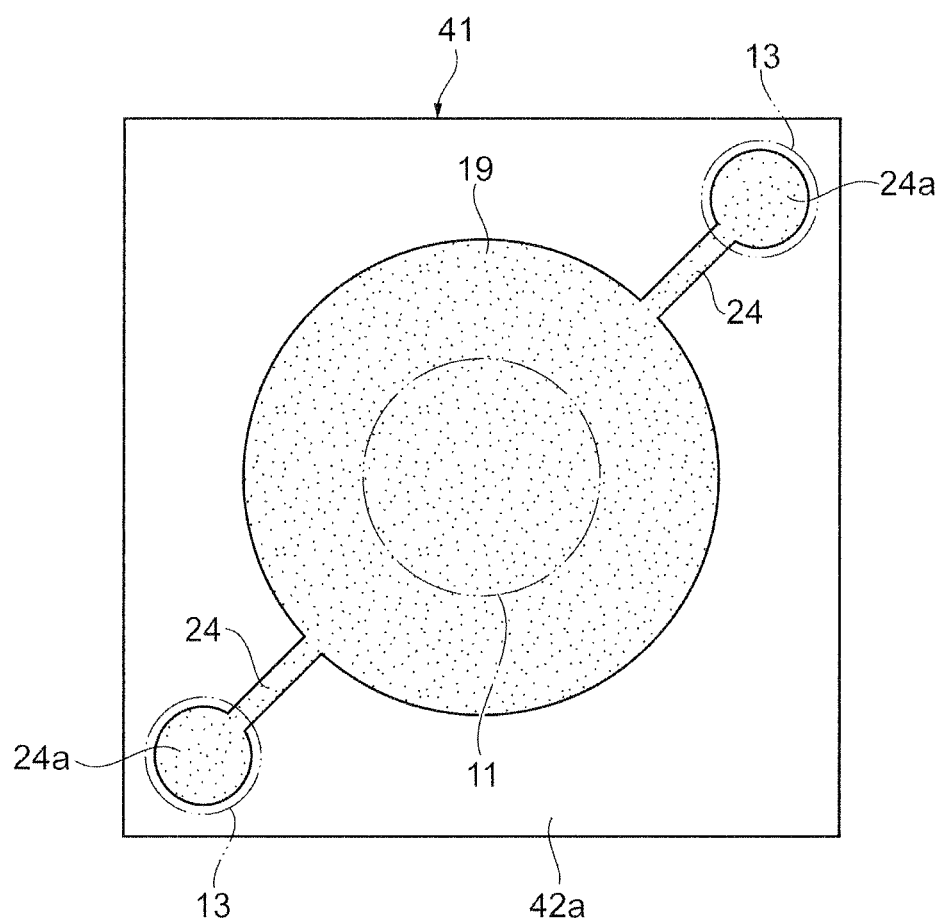
FIG. 5 is a plan view of a polysilicon layer provided with a second driving electrode.

As illustrated in FIGS. 2 and 5, the movable mirror 41 is provided with a second driving electrode 19 of, for example, a circular shape, opposite to the first driving electrode 17 and the compensation electrode 18 in the opposing direction D. The movable mirror 41 is further provided with a pair of wiring lines 24 such that the wiring line 24 extends from the second driving electrode 19 to immediately below each of the terminals 13 along a direction perpendicular to the opposing direction D. The second driving electrode 19 and the pair of wiring lines 24 are formed at predetermined portions in the polysilicon layer 42a by doping an impurity and thereby reducing resistance in the predetermined portions. Each of the terminals 13 is connected to an end portion 24a of each piece of the wiring line 24, thus allowing the second driving electrode 19 to be electrically connected to each of the terminals 13.

As illustrated in FIG. 2, in the Fabry-Perot interference filter 10A, the compensation electrode 18, connected to the same potential as the second driving electrode 19, is positioned on the opposite side of the second driving electrode 19 with respect to the first driving electrode 17 in the opposing direction D. That is, the first driving electrode 17 and the compensation electrode 18 are not disposed on the same plane in the fixed mirror 31 and thus the compensation electrode 18 is more apart from the second driving electrode 19 than the first driving electrode 17 is.

A surface 30a of the first laminate 30 (that is, a surface of the polysilicon layer 32c of the first laminate 30) is formed with an annular groove 25 surrounding the wiring line 23. The annular groove 25 extends, for example, in a circular manner. A bottom surface of the annular groove 25 reaches to the silicon nitride layer 33b of the first laminate 30. Inside the annular groove 25, an insulating member made of, for example, silicon oxide is disposed. This allows the wiring line 23 to be electrically insulated from the first driving electrode 17. The width of the annular groove 25 is, for example, 0.1 to 100 µm. Incidentally, a plurality of annular grooves 25 may be formed, for example, in such a manner to be concentrically aligned.

On the surface 40a of the second laminate 40, an annular groove 26 surrounding the terminal 12 is formed. The annular groove 26 extends, for example, in a circular manner. A bottom surface of the annular groove 26 reaches to the support layer 16. Inside the annular groove 26 is a gap. This allows the terminals 12 to be electrically insulated from the second driving electrode 19. The width of the annular groove 26 is for example 0.1 to 100 µm. Incidentally, a plurality of annular grooves 26 may be formed, for example, in such a manner to be concentrically aligned.

On a surface 14b of the substrate 14 on a light emitting side, a reflection prevention layer 51, a third laminate 52, an intermediate layer 53, and a fourth laminate 54 are laminated in the order mentioned. The reflection prevention layer 51 and the intermediate layer 53 have a similar configuration to those of the reflection prevention layer 15 and the support layer 16, respectively. The third laminate 52 and the fourth laminate 54 have lamination configurations each symmetrical to those of the first laminate 30 and the second laminate 40 with respect to the substrate 14. These reflection prevention layer 51, third laminate 52, intermediate layer 53, and the fourth laminate 54 form a laminate 50.

On a surface 50b of the laminate 50 on a light emitting side, a light shielding layer 27 to shield measurement light is formed. The light shielding layer 27 includes, for example, aluminum. In the light shielding layer 27 and the laminate 50, an opening 50a of, for example, a cylindrical shape is formed in such a manner as to include the light transmission region 11. The opening 50a opens to the light emitting side while a bottom surface of the opening 50a reaches the reflection prevention layer Si. A protective layer 28 is formed on a surface of the light shielding layer 27 and an inner surface of the opening 50a. The protective layer 28 includes, for example, aluminum oxide. Incidentally, when the thickness of the protective layer 28 is as thin as approximately 30 nm, optical influence by the protective layer 28 can be negligible.

Figure 6:
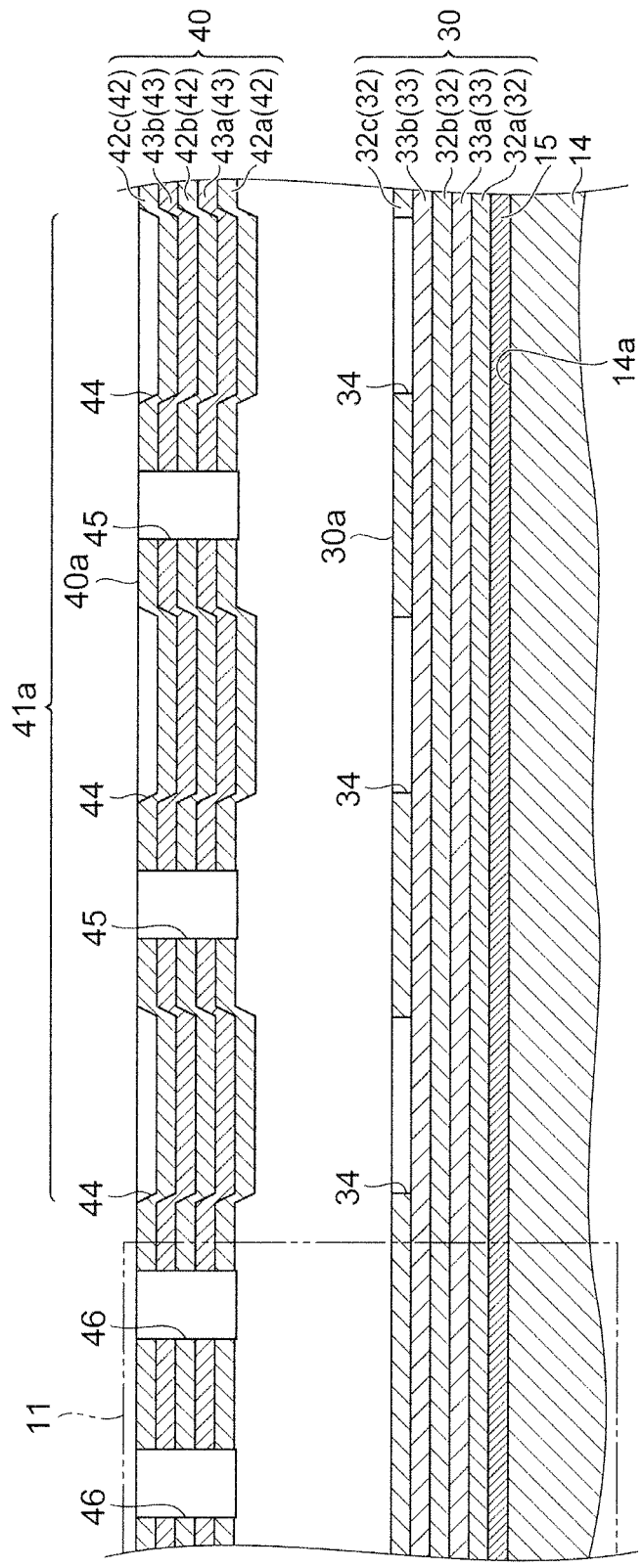
FIG. 6 is a partially enlarged cross-sectional view of the Fabry-Perot interference filter of the first embodiment.

As illustrated in FIGS. 2 and 6, a surrounding portion 41a surrounding the light transmission region 11 is defined in the movable mirror 41. The surrounding portion 41a is defined, for example, in a cylindrical shape. A plurality of (e.g. three) first annular grooves 44 surrounding the light transmission region 11 is formed in the surrounding portion 41a. Each of the first annular grooves 44 extends, for example, in a circular manner. Inside each of the first annular grooves 44 is a gap. The plurality of first annular grooves 44 are aligned such that one of adjacent first annular grooves 44 surrounds the other first annular groove 44 (that is, for example, concentrically). Each of the first annular grooves 44 opens to the opposite side of the gap S and is formed with the plurality of polysilicon layers 42 and the plurality of silicon nitride layers 43 each partially recessing toward the gap S. The width of each of the first annular grooves 44 is, for example, 0.1 to 100 µm. A distance between the adjacent first annular grooves 44 is, for example, 1 to 250 µm. Incidentally, each of the first annular grooves 44 is not limited to have a continuous annular shape but may have, for example, an intermittent annular shape. Alternatively, a part of adjacent first annular grooves 44 may be connected with each other.

Furthermore, a plurality of first through-holes 45 opening to the gap S side and the opposite side thereof is formed in the surrounding portion 41a (not illustrated in FIG. 2). At least a part of the plurality of first through-holes 45 is positioned between the adjacent first annular grooves 44. Each of the first through-holes 45 is formed in, for example, a cylindrical shape. A diameter of each of the first through-holes 45 is smaller than a width of the surrounding portion 41a in a diameter direction (when the plurality of first annular grooves 44 is aligned concentrically, a difference between an outer peripheral radius of the outermost first annular groove 44 and an inner peripheral radius of the innermost first annular groove 44), for example, 1 to 10 µm. The plurality of first through-holes 45 has a distance between the adjacent first through-holes 45 of, for example, 10 to 100 µm and is formed in a uniformly distributed manner. Furthermore, a plurality of second through-holes 46 opening to the gap S side and the opposite side thereof is formed at an inner portion of the surrounding portion 41a (portion surrounded by the surrounding portion 41a) in the movable mirror 41 (not illustrated in FIG. 2). Each of the second through-holes 46 are formed in, for example, a cylindrical shape. A diameter of each of the second through-holes 46 is, for example, 1 to 10 µm. The plurality of second through-holes 46 has a distance between the adjacent second through-holes 46 of, for example, 10 to 100 µm and is formed in a uniformly distributed manner.

A plurality of second annular grooves 34 corresponding to the plurality of first annular grooves 44 respectively in the opposing direction D is formed in the fixed mirror 31. Each of the second annular grooves 34 extends, for example, in a circular manner. Inside each of the second annular grooves 34 is a gap. The plurality of second annular grooves 34 are aligned such that one of adjacent second annular grooves 34 surrounds the other second annular groove 34 (that is, for example, concentrically). Each of the second annular grooves 34 opens to the gap S side and is formed by partially removing the polysilicon layer 32c along an inner edge of the first driving electrode 17. That is, an outer portion of the plurality of second annular grooves 34 in the fixed mirror 31 is provided with the first driving electrode 17. The width of each of the second annular grooves 34 is, for example, 0.1 to 100 µm. A distance between the adjacent second annular grooves 34 is, for example, 1 to 250 µm.

Figure 7:
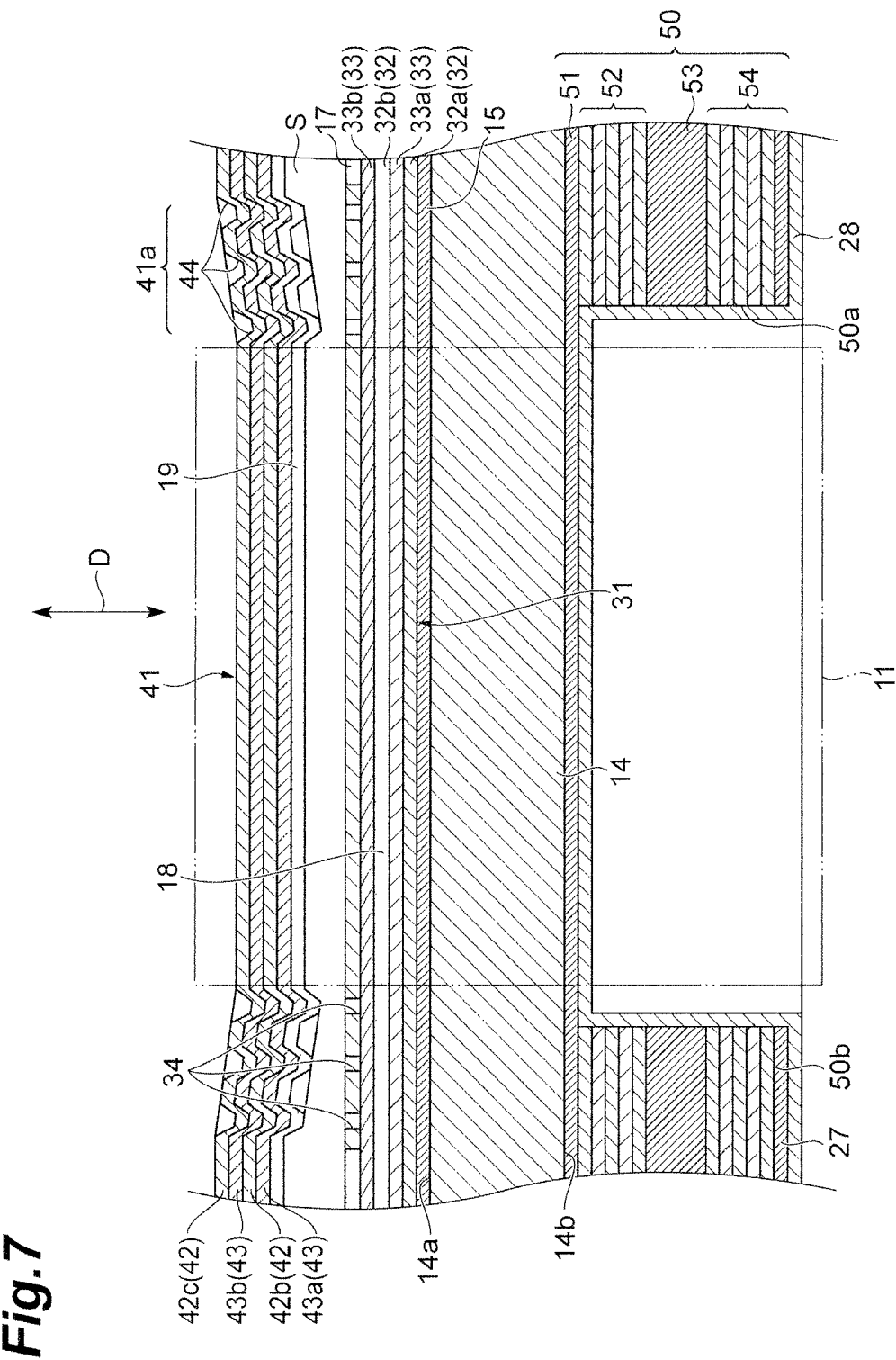
FIG. 7 is a cross-sectional view of the Fabry-Perot interference filter of the first embodiment upon driving.

In the Fabry-Perot interference filter 10A configured in the above manner, when a voltage is applied between the first driving electrode 17 and the second driving electrode 19 via the respective terminals 12 and 13, electrostatic force corresponding to the voltage is generated between the first driving electrode 17 and the second driving electrode 19. As illustrated in FIG. 7, this allows the movable mirror 41 to be deformed mainly in the surrounding portion 41 a and an outer portion thereof and thus the portion of the movable mirror 41 corresponding to the light transmission region 11 is pulled toward a side of the fixed mirror 31 while maintaining flatness. In this manner, a distance between the fixed mirror 31 and the movable mirror 41 in the light transmission region 11 is adjusted by electrostatic force generated, which is the voltage applied. A wavelength of light transmitted by the Fabry-Perot interference filter 10A is dependent on the distance between the fixed mirror 31 and the movable mirror 41 in the light transmission region 11. Therefore, adjusting the voltage to apply between the first driving electrode 17 and second driving electrode 19 allows for appropriately selecting a wavelength of light to be transmitted.

As described above, in this Fabry-Perot interference filter 10A, the plurality of first annular grooves 44 surrounding the light transmission region 11 is formed in the surrounding portion 41a, in the movable mirror 41, surrounding the light transmission region 11. Due to this, the surrounding portion 41a is easily deformed upon driving (when a distance between the fixed mirror 31 and the movable mirror 41 in the light transmission region 11 is adjusted by electrostatic force). Furthermore, the plurality of first through-holes 45 opening to the gap S side and the opposite side thereof is formed in the surrounding portion 41a. This results in good balance of stress generated in the movable mirror 41 upon driving. Therefore, flatness of the movable mirror 41 in the light transmission region 11 upon driving can be enhanced. Moreover, the plurality of first through-holes 45 formed in the surrounding portion 41a allows for distributing the stress generated in the movable mirror 41 upon driving. Therefore, durability of the movable mirror 41 can be enhanced.

Furthermore in a situation where the Fabry-Perot interference filter 10A is heated, distortion by heat occurs. As described above, however, since the stress generated in the movable mirror 41 is well-balanced, distortion in the movable mirror 41 is also homogenized. Therefore, deterioration of resolution (transmission wavelength characteristics) due to distortion of the movable mirror 41 can be suppressed.

In the Fabry-Perot interference filter 10A, the plurality of second through-holes 46 opening to the gap S side and the opposite side is formed in the inner portion of the surrounding portion 41a in the movable mirror 41. Therefore, using the plurality of first through-holes 45 and the plurality of second through-holes as 46 etching holes when the gap S between the fixed mirror 31 and the movable mirror 41 is formed by etching can save time required for forming the gap S.

Also in the Fabry-Perot interference filter 10A, the plurality of second annular grooves 34 is formed in the fixed mirror 31, which is also provided with the first driving electrode 17 at the outer portion of the plurality of second annular grooves 34. This allows the first driving electrode 17 and the inner portion of the plurality of second annular grooves 34 in the fixed mirror 31 (that is, an inner portion of the plurality of second annular grooves 34 in the polysilicon layer 32c) to be electrically insulated and thus flatness of the movable mirror 41 in the light transmission region 11 upon driving can be further enhanced.

Incidentally, when the plurality of second annular grooves 34 is formed in the fixed mirror 31, electrical insulation between the outer portion and the inner portion thereof is ensured as compared to a case where one second annular groove 34 is formed in the fixed mirror 31. This is because even when current may leak due to a failure in a part of the plurality of second annular grooves 34, the rest of the second annular grooves 34 can prevent leakage of current. Moreover, even when a failure occurs in all of the second annular grooves 34 and current may leak, the leak current would be subjected to detour.

In the Fabry-Perot interference filter 10A, the fixed mirror 31 is provided with the compensation electrode 18 connected to the same potential as the second driving electrode 19 and the compensation electrode 18 is positioned on the opposite side of the second driving electrode 19 with respect to the first driving electrode 17 in the opposing direction D. This allows the compensation electrode 18 formed in the fixed mirror 31 in such a manner as to include the light transmission region 11 to have the same potential as that of the second driving electrode 19 provided to the movable mirror 41 and thus flatness of the movable mirror 41 in the light transmission region 11 upon driving can be further enhanced. Furthermore, since the compensation electrode 18 is not positioned between the first driving electrode 17 and the second driving electrode 19, electrostatic force corresponding to the voltage applied between the first driving electrode 17 and the second driving electrode 19 can be generated in a preferable manner.

Incidentally, enhancement of flatness of the movable mirror 41 in the light transmission region 11 upon driving is more remarkable when the number of first annular grooves 44 is increased as compared to increasing the width of, for example, one first annular groove 44. Furthermore, as described above, increasing the number of second annular grooves 34 can further ensure electrical insulation between the outer portion and the inner portion thereof and thus increasing the number of second annular grooves 34 also contributes to enhancement of flatness of the movable mirror 41 in the light transmission region 11 upon driving.

[Manufacturing Method of Fabry-Perot Interference Filter]

A manufacturing method of the aforementioned Fabry-Perot interference filter 10A will be described with reference to FIGS. 2 and 6. First, the reflection prevention layer 15 is laminated on the surface 14a of the substrate 14. Simultaneously, the reflection prevention layer 51g is laminated on the surface 14b of the substrate 14. Thereafter, the polysilicon layer 32a, the silicon nitride layer 33a, and the polysilicon layer 32b which form a part of the first laminate 30 are laminated on the reflection prevention layer 15 in the order mentioned. Simultaneously, a polysilicon layer, a silicon nitride layer, and a polysilicon layer which form a part of the third laminate 52 are laminated on the reflection prevention layer 51 in the order mentioned. Subsequently, the compensation electrode 18 and the pair of wiring lines 22 are formed at a predetermined portion in the polysilicon layer 32b by doping an impurity and thereby reducing resistance in the predetermined portion.

The silicon nitride layer 33b which forms a part of the first laminate 30 is then laminated on the polysilicon layer 32b. Simultaneously, a silicon nitride layer which forms a part of the third laminate 52 is laminated on a polysilicon layer which forms a part of the third laminate 52. A predetermined portion of the silicon nitride layer 33b is then removed by etching and thereby a part of the through-hole to receive the wiring line 23 is formed.

The polysilicon layer 32c which forms a part of the first laminate 30 is then laminated on the silicon nitride layer 33b. Simultaneously, a polysilicon layer which forms a part of the third laminate 52 is laminated on the silicon nitride layer which forms a part of the third laminate 52. Subsequently, the first driving electrode 17 and the pair of wiring lines 21 are formed at a predetermined portion in the polysilicon layer 32c by doping an impurity and thereby reducing resistance in the predetermined portion. Also, a predetermined portion of the polysilicon layer 32c is removed by etching and thereby forming the annular groove 25, the plurality of second annular grooves 34, and a part of the through-hole to receive the wiring line 23. Incidentally, an etching stopper may be provided in advance in order to selectively remove the predetermined portion of the polysilicon layer 32c. Thereafter, the insulating member of, for example, silicon oxide, is disposed inside the annular groove 25.

The support layer 16 is then laminated on the polysilicon layer 32c. Simultaneously, the intermediate layer 53 is laminated on the polysilicon layer which forms a part of the third laminate 52. Here, the support layer 16 partially recesses in the plurality of second annular grooves 34 formed in the polysilicon layer 32c and thus a plurality of annular grooves resembling the plurality of second annular grooves 34 is formed on a surface of the support layer 16. Thereafter, a predetermined portion of the support layer 16 is removed by etching and thereby forming a part of the through-hole to receive the wiring line 23 and a part of the through-hole to receive each of the terminals 12 for further connection. Subsequently, the wiring line 23 is disposed inside the through-hole extending from a surface of the support layer 16 to the polysilicon layer 32b of the first laminate 30.

The polysilicon layer 42a which forms a part of the second laminate 40 is then laminated on the support layer 16. Simultaneously, a polysilicon layer which forms a part of the fourth laminate 54 is laminated on the intermediate layer 53. Subsequently, the second driving electrode 19 and the pair of wiring lines 24 are formed at a predetermined portion in the polysilicon layer 42a by doping an impurity and thereby reducing resistance in the predetermined portion.

Thereafter, the silicon nitride layer 43a, the polysilicon layer 42b, the silicon nitride layer 43b, and the polysilicon layer 42c which form a part of the second laminate 40 are laminated on the polysilicon layer 42a in the order mentioned. Simultaneously, a silicon nitride layer, polysilicon layer, silicon nitride layer, and polysilicon layer which form a part of the fourth laminate 54 are laminated on the polysilicon layer which form a part of the fourth laminate 54 in the order mentioned. Here, the plurality of polysilicon layers 42 and the plurality of silicon nitride layers 43 each partially recess in the plurality of annular grooves formed on a surface of the support layer 16 and thus a plurality of first annular grooves 44 resembling the plurality of second annular grooves 34 is formed on the surface 40a of the second laminate 40 (that is, a surface of the polysilicon layer 42c of the second laminate 40) immediately above the second annular grooves 34.

Subsequently, predetermined portions of the second laminate 40 and the support layer 16 are removed by etching and thereby forming a through-hole extending from the surface 40a of the second laminate 40 to the polysilicon layer 32c of the first laminate 30. Also, a predetermined portion of the second laminate 40 is removed by etching and thereby forming a through-hole extending from the surface 40a of the second laminate 40 to the polysilicon layer 42a of the second laminate 40. Subsequently, a conductive member is disposed in the through-hole extending from the surface 40a of the second laminate 40 to the polysilicon layer 32c of the first laminate 30, thereby forming the terminal 12. Also, a conductive member is disposed in the through-hole extending from the surface 40a of the second laminate 40 to the polysilicon layer 42a of the second laminate 40, thereby forming the terminal 13.

Subsequently, predetermined portions of the second laminate 40 are removed by etching and thereby forming the first through-holes 45, the second through-holes 46, and the annular groove 26 extending from the surface 40a of the second laminate 40 to the support layer 16. Subsequently, the light shielding layer 27 is laminated on the fourth laminate 54. Predetermined portions of the third laminate 52, the intermediate layer 53, the fourth laminate 54, and the light shielding layer 27 are then removed by etching and thereby forming the opening 50a. Thereafter, the protective layer 28 is formed on the surface of the light shielding layer 27 and the inner surface of the opening 50a. Incidentally, the light shielding layer 27 may be formed after etching or during etching.

Subsequently, a predetermined portion (center portion) of the support layer 16 is removed as a sacrificial layer by etching via the first through-holes 45 and the second through-holes 46, thereby forming the gap S. Performing gas phase etching using hydrofluoric acid gas in order to form the gap S in the support layer 16 of silicon oxide prevents erosion of the plurality of polysilicon layers 32 and the plurality of silicon nitride layers 33 of the first laminate 30 as well as the plurality of polysilicon layers 42 and the plurality of silicon nitride layers 43 of the second laminate 40. Here, the reflection prevention layer 51 of silicon oxide is covered by the protective layer 28 of aluminum oxide on a bottom surface of the opening 50a and thus erosion of the reflection prevention layer 51 is also prevented.

The above manufacturing steps are performed on a wafer including a plurality of parts each forming the substrate 14. Performing the above manufacturing steps and then processing the wafer into chips allow for obtaining the Fabry-Perot interference filter 10A. Incidentally, for processing the wafer into chips, it is preferable to use a laser machining technique of an internal processing type where a modified region is formed in an inner portion or the like of the substrate 14 by irradiation with a laser beam and thereby dividing the wafer with the modified region as an origin. The laser machining technique of the internal processing type can suppress a damage to the movable mirror 41 of a membrane shape upon processing the wafer into chips.

As described above, in the manufacturing method of the Fabry-Perot interference filter 10A, the plurality of first through-holes 45 in addition to the plurality of second through-holes 46 can be used as etching holes when the gap S is formed in the support layer 16 by etching and thus time required for forming the gap S can be shorter.

Meanwhile, it is known that a reaction of silicon nitride and hydrofluoric acid gas generates ammonium fluoride-based residues (see B. DU BOIS, HF ETCHING OF SI-OXIDES AND SI-NITRIDES FOR SURFACE MICRO-MACHINING Sensor Technology 2001, Proceedings of the Sensor Technology Conference 2001, held in Enschede, The Netherlands, 14-15 May, 2001, pp. 131-136). When gas phase etching using hydrofluoric acid gas is performed in order to form the gap S in the support layer 16 of silicon oxide in the manufacturing steps of the Fabry-Perot interference filter 10A, generation of the residues can be suppressed in a case where the silicon nitride layer 33b is exposed at bottom surfaces of the plurality of second annular grooves 34 in the fixed mirror 31 than in a case where the silicon nitride layer 33b is exposed at a bottom surface of one annular groove including the plurality of second annular grooves 34. Incidentally, the ammonium fluoride-based residues can be removed by vacuum bake-out and subliming thereby.

[Second Embodiment]

Figure 8:
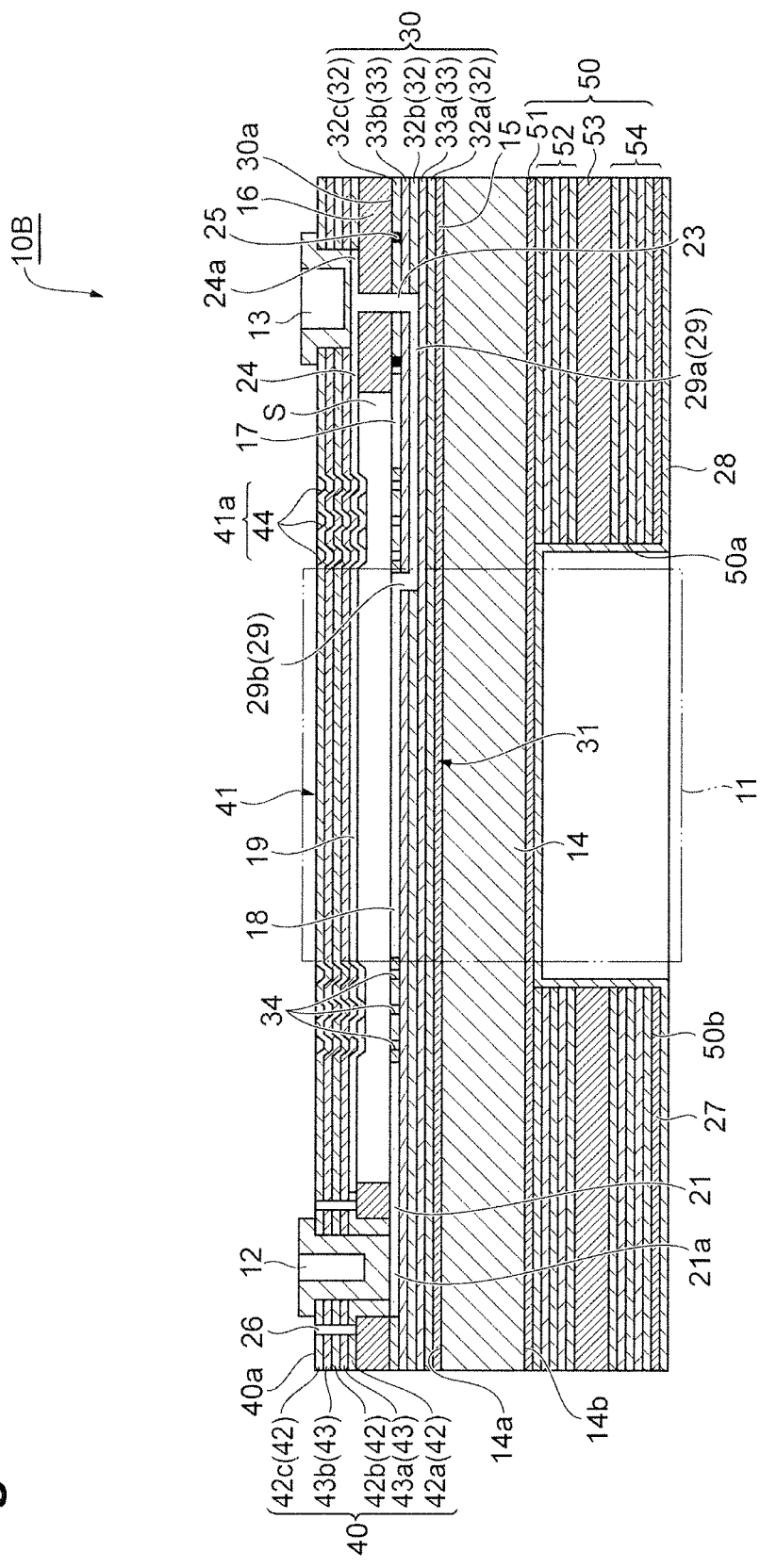
FIG. 8 is a cross-sectional view of a Fabry-Perot interference filter of a second embodiment.

As illustrated in FIG. 8, a Fabry-Perot interference filter 10B is different from the aforementioned Fabry-Perot interference filter 10A in a point that a first driving electrode 17 and a compensation electrode 18 are disposed on the same plane of a fixed mirror 31. In the Fabry-Perot interference filter 10B, the compensation electrode 18 is positioned inside the first driving electrode 17 via a plurality of second annular grooves 34. That is, the compensation electrode 18 is provided to a polysilicon layer 32c of a first laminate 30 together with the first driving electrode 17. The first driving electrode 17 and the compensation electrode 18 are formed at a predetermined portion of the polysilicon layer 32c by doping an impurity and thereby reducing resistance in the predetermined portion.

The compensation electrode 18 is connected to each piece of wiring line 23 via a pair of wiring lines 29, thereby electrically connected to each of the terminals 13. The respective pieces of wiring line 29 include wiring line 29a and 29b. The pair of wiring lines 29a is provided to a polysilicon layer 32b of the first laminate 30 such that the wiring line 29a extends from end portions of the respective pieces of wiring line 23 to immediately below an edge portion of the compensation electrode 18 along a direction perpendicular to an opposing direction D. The pair of wiring lines 29a is formed at a predetermined portion in the polysilicon layer 32b by doping an impurity and thereby reducing resistance in the predetermined portion. The pair of wiring lines 29b extends from the edge portion of the compensation electrode 18 to end portions of the respective pieces of wiring line 29a along the opposing direction D and is disposed inside a through-hole extending from the compensation electrode 18 to the polysilicon layer 32b.

In the Fabry-Perot interference filter 10B configured in the above manner, a plurality of first annular grooves 44 and a plurality of first through-holes 45 are formed in a surrounding portion 41a of a movable mirror 41 like in the Fabry-Perot interference filter 10A described above. Therefore, flatness of the movable mirror 41 in a light transmission region 11 upon driving as well as durability of the movable mirror 41 can be enhanced.

In the Fabry-Perot interference filter 10B, the compensation electrode 18 connected to the same potential as the second driving electrode 19 is positioned inside the first driving electrode 17 via the plurality of second annular grooves 34. This can ensure electrical insulation between the first driving electrode 17 and the compensation electrode 18 disposed on the same plane of the fixed mirror 31 and thus flatness of the movable mirror 41 in the light transmission region 11 upon driving can be further enhanced.

[Third Embodiment]

As illustrated in FIG. 9, a Fabry-Perot interference filter 10C is different from the aforementioned Fabry-Perot interference filter 10A mainly in points that a fixed mirror 31 is not provided with a compensation electrode 18, a plurality of second annular grooves 34 is not formed in the fixed mirror 31, and a plurality of first annular grooves 44 is formed in a surrounding portion 41a of a movable mirror 41 by etching. In the Fabry-Perot interference filter 10C, predetermined portions of a second laminate 40 are removed by etching, and thereby the plurality of first annular grooves 44 extending from a surface 40a of the second laminate 40 to a polysilicon layer 42a of the second laminate 40 is formed. Incidentally, an etching stopper may be provided in advance in order to selectively remove the predetermined portions of the second laminate 40.

In the Fabry-Perot interference filter 10C configured in the above manner, the plurality of first annular grooves 44 and a plurality of first through-holes 45 are formed in the surrounding portion 41a of the movable mirror 41 like in the Fabry-Perot interference filter 10A described above. Therefore, flatness of the movable mirror 41 in a light transmission region 11 upon driving as well as durability of the movable mirror 41 can be enhanced.

Furthermore, in the Fabry-Perot interference filter 10C, a plurality of second annular grooves 34 is not formed in the fixed mirror 31 and thus a first driving electrode 17 and an inner portion of the first driving electrode 17 in a polysilicon layer 32c are electrically connected. Due to this, the inner portion of the first driving electrode 17 in the polysilicon layer 32c and a second driving electrode 19 have a potential difference, thereby generating electrostatic force. This allows for reducing a voltage to be applied between the first driving electrode 17 and the second driving electrode 19 for adjusting a distance between the fixed mirror 31 and the movable mirror 41.

In the Fabry-Perot interference filter 10C, even when gas phase etching using hydrofluoric acid gas is performed in order to form a gap S in a support layer 16 of silicon oxide, generation of ammonium fluoride-based residues can be further suppressed since a plurality of second annular grooves 34 is not formed in the fixed mirror 31 and thus a silicon nitride layer 33b is not exposed.

The first, second, and third embodiments of the present invention have been described above; however, the present invention is not limited to the aforementioned first, second, and third embodiments. For example, the number and thickness of the polysilicon layers 32 and the silicon nitride layers 33 which form the first laminate 30 as well as the number and thickness of the polysilicon layers 42 and the silicon nitride layers 43 which form the second laminate 40 may be changed as appropriate according to a resolution and application range of a wavelength of light to be transmitted by each of the Fabry-Perot interference filters 10A, 10B, and 10C. Moreover, the through-hole in the movable mirror 41 may be formed not only in the surrounding portion 41a and an inner area thereof but also in an outer area of the surrounding portion 41a. Also, the light transmission region 11 is not limited to an area narrower than the opening 50a but may be defined, for example, by the opening 50a when measurement light of a wider area than that of the opening 50a is incident thereon. The configuration of each of the Fabry-Perot interference filters 10A, 10B, and 10C is not limited to include the aforementioned materials or shapes but may employ various materials or shapes.

INDUSTRIAL APPLICABILITY

The present invention can provide a Fabry-Perot interference filter that allows for enhancing flatness of a movable mirror in a light transmission region upon driving and enhancement of durability of the movable mirror.

REFERENCE SIGNS LIST 10A, 10B, 10C: Fabry-Perot interference filter, 11: light transmission region, 17: first driving electrode, 18: compensation electrode, 19: second driving electrode, 31: fixed mirror, 34: second annular groove, 41: movable mirror, 41a: surrounding portion, 44: first annular groove, 45; first through-hole, 46: second through-hole, S: gap

The invention claimed is:

1. A Fabry-Perot interference filter, comprising:
a fixed mirror; and
a movable mirror disposed opposite to the fixed mirror via an air gap, the distance between the fixed mirror and the movable mirror in a light transmission region being adjusted by electrostatic force applied between at least two driving electrodes,
wherein a plurality of first annular grooves are concentrically formed in the movable mirror to form an annulus in which the light transmission region is centered, and
wherein a plurality of first through-holes are formed in the Movable mirror, are open to the air gap side and an opposite side of the air gap, are formed outside of the light transmission region, and wherein at least some of the plurality of first through-holes are formed in a region between adjacent first annular grooves of the plurality of first annular grooves.

2. The Fabry-Perot interference filter according to claim 1,
wherein a plurality of second through-holes opening to the air gap side and the opposite side of the movable mirror is formed in the movable mirror, where the plurality of second through-holes are located within the annulus defined by the plurality of first annular grooves and at least some of the plurality of second through-holes are located in the light transmission region.

3. The Fabry-Perot interference filter according to claim 1,
wherein a plurality of second annular grooves corresponding to the plurality of first annular grooves respectively in a directly opposing direction where the fixed mirror and the movable mirror are opposed is formed in the fixed mirror, a portion outside the annulus defined by the plurality of second annular grooves in the fixed mirror is provided with a first driving electrode of the at least two driving electrodes to surround the light transmission region, and the movable mirror is provided with a second driving electrode of the at least two driving electrodes, a voltage being applied between the first driving electrode and the second driving electrode in order to generate the electrostatic force.

4. The Fabry-Perot interference filter according to claim 3, wherein the fixed mirror is provided with a compensation electrode, wherein at least a portion of the compensation electrode is within the light transmission region, the compensation electrode being connected to the same potential as the second driving electrode, and with respect to the first driving electrode, the compensation electrode is positioned on an opposite side than is the second driving electrode, in the opposing direction.

5. The Fabry-Perot interference filter according to claim 3, wherein the fixed mirror is provided with a compensation electrode, wherein at least a portion of the compensation electrode is within the light transmission region, the compensation electrode being connected to the same potential as the second driving electrode, and at least a portion of the compensation electrode is positioned in the same layer as the first driving electrode interior to the first driving electrode with the plurality of second annular grooves positioned between the compensation electrode and the first driving electrode.

6. The Fabry-Perot interference filter according to claim 1, wherein the plurality of first annular grooves is three or more first annular grooves.

7. The Fabry-Perot interference filter according to claim 1, wherein each of the plurality of first annular grooves has side faces and a bottom face.

8. A Fabry-Perot interference filter, comprising:

a fixed mirror; and a movable mirror disposed opposite to the fixed mirror via an air gap, the distance between the fixed mirror and the movable mirror in a light transmission region being adjusted by electrostatic force applied between at least two driving electrodes, wherein a plurality of first annular grooves are concentrically formed in the movable mirror, the light transmission region being centered within an annulus defined by the plurality of first annular grooves, the distance between the movable mirror and the fixed mirror across the air gap is larger in the light transmission region than in the region of the first plurality of annular grooves, and wherein regardless of whether electrostatic force is applied, a width of the air gap in the light transmission region in a directly opposing direction where the fixed mirror and the movable mirror are opposed is larger than a smallest width of the air gap in the annulus in the directly opposing direction.

* * * * *